United States Patent
Wang et al.

(10) Patent No.: US 9,465,241 B2
(45) Date of Patent: Oct. 11, 2016

(54) APPARATUS FOR APPLYING CURING VOLTAGES TO LIQUID CRYSTAL SUBSTRATE

(71) Applicants: JinJie Wang, Guangdong (CN); Cheng-Hung Chen, Guangdong (CN)

(72) Inventors: JinJie Wang, Guangdong (CN); Cheng-Hung Chen, Guangdong (CN)

(73) Assignee: SHENZHEN CHINA STAR OPTOELECTRONICS TECHNOLOGY CO., LTD. (CN)

( * ) Notice: Subject to any disclaimer, the term of this patent is extended or adjusted under 35 U.S.C. 154(b) by 930 days.

(21) Appl. No.: 13/703,077

(22) PCT Filed: Sep. 26, 2012

(86) PCT No.: PCT/CN2012/082065
§ 371 (c)(1),
(2) Date: Dec. 10, 2012

(87) PCT Pub. No.: WO2014/047817
PCT Pub. Date: Apr. 3, 2014

(65) Prior Publication Data
US 2014/0087620 A1  Mar. 27, 2014

(30) Foreign Application Priority Data
Sep. 25, 2012 (CN) .......................... 2012 1 0359609

(51) Int. Cl.
*G01R 31/26* (2014.01)
*G02F 1/13* (2006.01)
*G02F 1/1337* (2006.01)

(52) U.S. Cl.
CPC ....... *G02F 1/1303* (2013.01); *G02F 1/133711* (2013.01); *G02F 2001/133715* (2013.01)

(58) Field of Classification Search
CPC ..................... G02F 1/1303; G02F 1/133711
USPC .......... 324/760.01; 156/275.5; 349/123, 187; 345/87; 428/1.1, 1.2
See application file for complete search history.

(56) References Cited

U.S. PATENT DOCUMENTS 6,157,425 A * 12/2000 Kuo ..................... G02F 1/1393
349/88

FOREIGN PATENT DOCUMENTS

CN    201852880 U  *  6/2011

* cited by examiner

*Primary Examiner* — Daniel Miller
(74) *Attorney, Agent, or Firm* — Kirton McConkie; Evan R. Witt

(57) ABSTRACT

The present invention discloses an apparatus for applying curing voltages to a liquid crystal substrate. The apparatus includes a plurality of probes, a detecting unit, and an alarm unit. The probes are utilized to apply a voltage to the liquid crystal substrate. The detecting unit is electrically coupled to the probes for determining whether the curing voltages are within a threshold range. The alarm unit is electrically coupled to the detecting unit for giving an alarm prompt when the voltage is not within the threshold range, so as to remind a person without delay. Therefore, the curing voltage applying apparatus of the present invention is capable of increasing product yield, so as to reduce production costs.

10 Claims, 5 Drawing Sheets

APPARATUS FOR APPLYING CURING VOLTAGES TO LIQUID CRYSTAL SUBSTRATE

FIELD OF THE INVENTION

The present invention relates to a liquid crystal display (LCD) production technique, and especially to an apparatus for applying curing voltages to a liquid crystal substrate in a photo-alignment process.

BACKGROUND OF THE INVENTION

It is well known that an initial guiding angle (pretilt angle) of liquid-crystal molecules needs to be determined by an alignment film in an LCD panel. The liquid-crystal molecules are aligned generally by means of a rubbing process for the alignment film. However, the rubbing process for the alignment film needs to be accurately controlled, but the operation of this technological process is not easy to control. Therefore, at present, a photo-alignment technique by using polymers has been proposed to overcome the drawback with respect to the above-mentioned rubbing alignment.

In general, reactive monomers need to be blended into an LC layer first, and then a voltage applying device is employed to apply a predetermined voltage to the LC layer in the photo-alignment technique. The LC layer is irradiated by ultraviolet (UV) light under the predetermined voltage. The reactive monomers are then polymerized and cured to form a polymer layer simultaneously on two opposite sides of the LC layer, so that the liquid-crystal molecules have a certain pretilt angle.

Referring to FIG. 1, FIG. 1 is a schematic drawing illustrating a conventional apparatus for applying curing voltages to a liquid crystal substrate. The liquid crystal substrate 10, which has a need for the photo-alignment process, is coupled to an external voltage applying device 20 via curing lines 122 and corresponding curing pads 124 outside a pixel region 120. Said applied predetermined voltage is transmitted to the pixel region 120 via the curing lines 122 by multiple probe pins 240 of a power supply 220 of the voltage applying device 20 electrically contacting the curing pads 124.

RGB signals are usually separated in the curing process, but the same voltages are fed via the probes 240. This can inspect more images in the following processes. However, the voltages of said fed RGB signals certainly have a subtle distinction due to a line resistance, machine accuracy, and other actual factors. When the voltages vary within a certain range, there is no influence on the panel to correctly display. But when the variation of the voltages is excessive, there is some difference in the pretilt angle of the liquid-crystal molecules due to the variation of the curing voltages, such that an abnormal display appears on subsequently displayed images. Moreover, because a person can not view the display of the panel inside a machine during the curing process, this abnormality can not be removed immediately.

In summary, there is a need to solve the problem of the poor alignment quality stemming from the variation of the curing voltages.

SUMMARY OF THE INVENTION

An objective of the present invention is to provide an apparatus for applying curing voltage to a liquid crystal substrate, thereby solving the problem of a poor alignment quality stemming from the difference of the curing voltages in the prior art.

To achieve the foregoing objective, a preferred embodiment of the present invention provides an apparatus for applying curing voltages to a liquid crystal substrate. The apparatus includes a plurality of probes, a detecting unit, and an alarm unit. The probes are utilized to apply a voltage to the liquid crystal substrate. The detecting unit is electrically coupled to the probes for determining whether the curing voltages are within a threshold range. The alarm unit is electrically coupled to the detecting unit for giving an alarm prompt when the voltage is not within the threshold range.

In the apparatus of the preferred embodiment of the present invention, the detecting unit is a window comparator circuit. Specifically, the window comparator circuit includes a first amplifier, a first diode, a second amplifier, and a second diode. The first amplifier has a first noninverting input, a first inverting input, and a first output. A first threshold voltage is provided for the first inverting input. The first diode has a first anode and a first cathode; the first anode is coupled to the first output of the first amplifier. The second amplifier has a second noninverting input, a second inverting input, and a second output. A second threshold voltage is provided for the second noninverting input. The voltage is provided for the first noninverting input and the second inverting input. The second diode has a second anode and a second cathode. The second anode is coupled to the second output of the second amplifier, and the second cathode and the first cathode of the first diode are coupled to each other and both are coupled to the alarm unit. In addition, the window comparator circuit further includes a Zener diode, whose anode is grounded; whose cathode is coupled to the first cathode of the first diode and the second cathode of the second diode, and coupled to the alarm unit.

In the apparatus of the preferred embodiment of the present invention, the threshold range is interposed between the first threshold voltage and the second threshold voltage, and the first threshold voltage is larger than the second threshold voltage. Specifically, when the voltage is larger than the first threshold voltage, the first diode is in a conducting state, the second diode is in a cutoff state, and the window comparator circuit outputs an alarm signal to the alarm unit. When the voltage is less than the second threshold voltage, the first diode is in the cutoff state, the second diode is in the conducting state, and the window comparator circuit outputs an alarm signal to the alarm unit. When the voltage is within the threshold range, both the first diode and the second diode are in the cutoff state, and the window comparator circuit outputs 0.

In the apparatus of the preferred embodiment of the present invention, the alarm prompt given by the alarm unit includes a prompt of sound, light, or electricity.

Similarly, to achieve the foregoing objective, another preferred embodiment of the present invention provides an apparatus for applying curing voltages to a liquid crystal substrate. The apparatus includes a plurality of probes, a plurality of detecting units, and an alarm unit. The probes are utilized to apply a plurality of curing voltages to the liquid crystal substrate. The detecting units are electrically coupled to the probes for determining whether the curing voltages are within a threshold range. The alarm unit are electrically coupled to the detecting units and utilized to give an alarm prompt when any of the curing voltages of the probes is not within the threshold range.

In the apparatus of the preferred embodiment of the present invention, the detecting units are window comparator circuits which have an equal number of the probes and are utilized to determine the curing voltage of every single probe, respectively.

In the apparatus of the preferred embodiment of the present invention, each of the window comparator circuits includes a first amplifier, a first diode, a second amplifier, and a second diode. The first amplifier has a first noninverting input, a first inverting input, and a first output. A first threshold voltage is provided for the first inverting input. The first diode has a first anode and a first cathode; the first anode is coupled to the first output of the first amplifier. The second amplifier has a second noninverting input, a second inverting input, and a second output. A second threshold voltage is provided for the second noninverting input. The corresponding probe is electrically coupled to the first noninverting input and the second inverting input. The second diode has a second anode and a second cathode. The second anode is coupled to the second output of the second amplifier; the second cathode and the first cathode of the first diode are coupled to each other and both are coupled to the alarm unit.

In comparison with the prior art, the detecting unit implemented by the window comparator circuit according to the present invention can monitor the curing voltages in constant during the curing process. When the curing voltages are within the threshold range, the alarm unit does not warn; when the curing voltages are not within the threshold range, the alarm prompt is given in order to remind the person without delay. Therefore, the apparatus for applying the curing voltages to the liquid crystal substrate according to the present invention is capable of increasing product yield, so as to reduce the production costs.

It is to be understood that both the foregoing general description and the following detailed description of the present invention are exemplary and explanatory and are intended to provide further explanation of the invention as claimed.

DETAILED DESCRIPTION OF THE PREFERRED EMBODIMENTS

Descriptions of the following embodiments refer to attached drawings which are utilized to exemplify specific embodiments.

Figure 1:
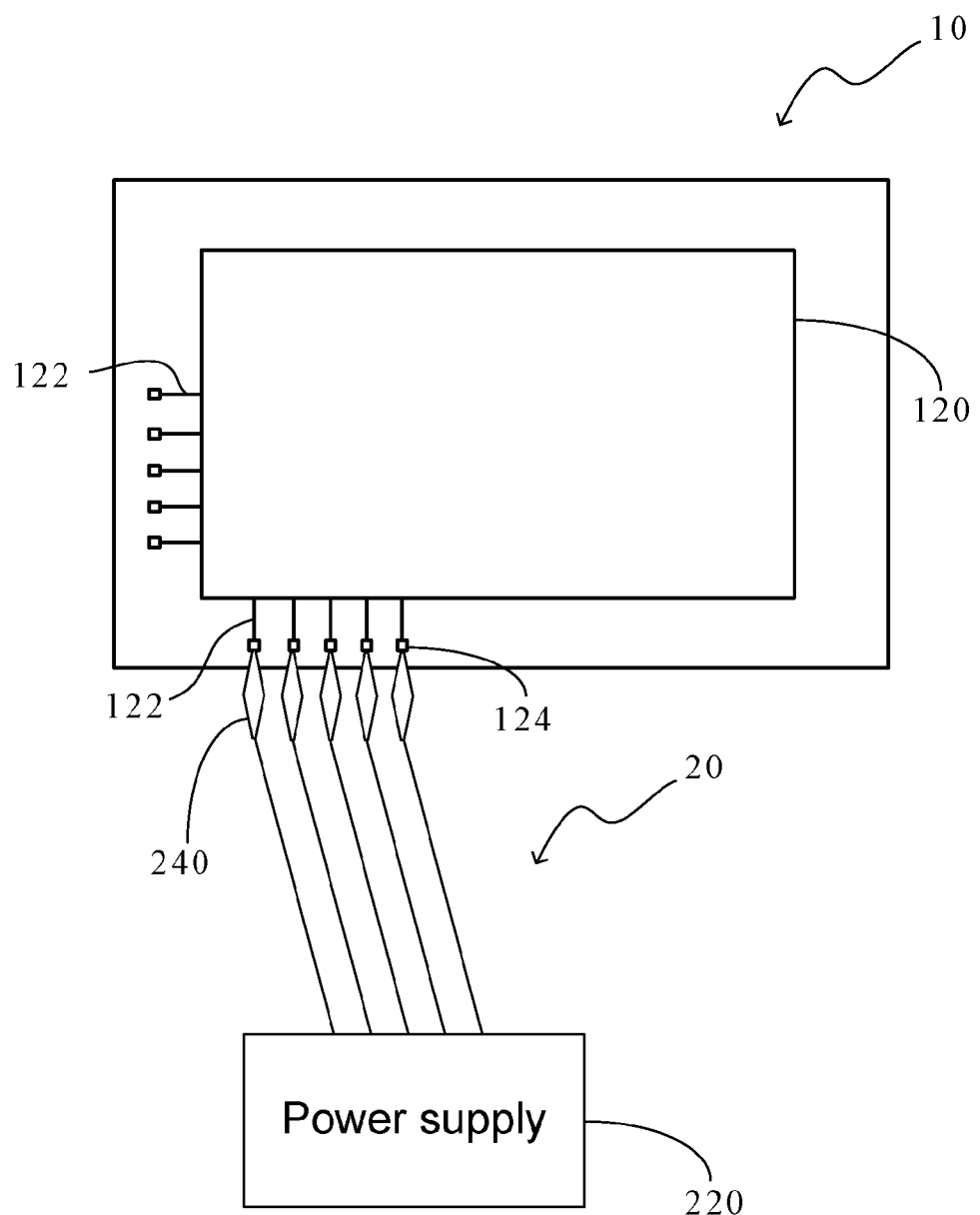
FIG. 1 is a schematic drawing illustrating a conventional apparatus for applying curing voltages to a liquid crystal substrate.
Figure 2:
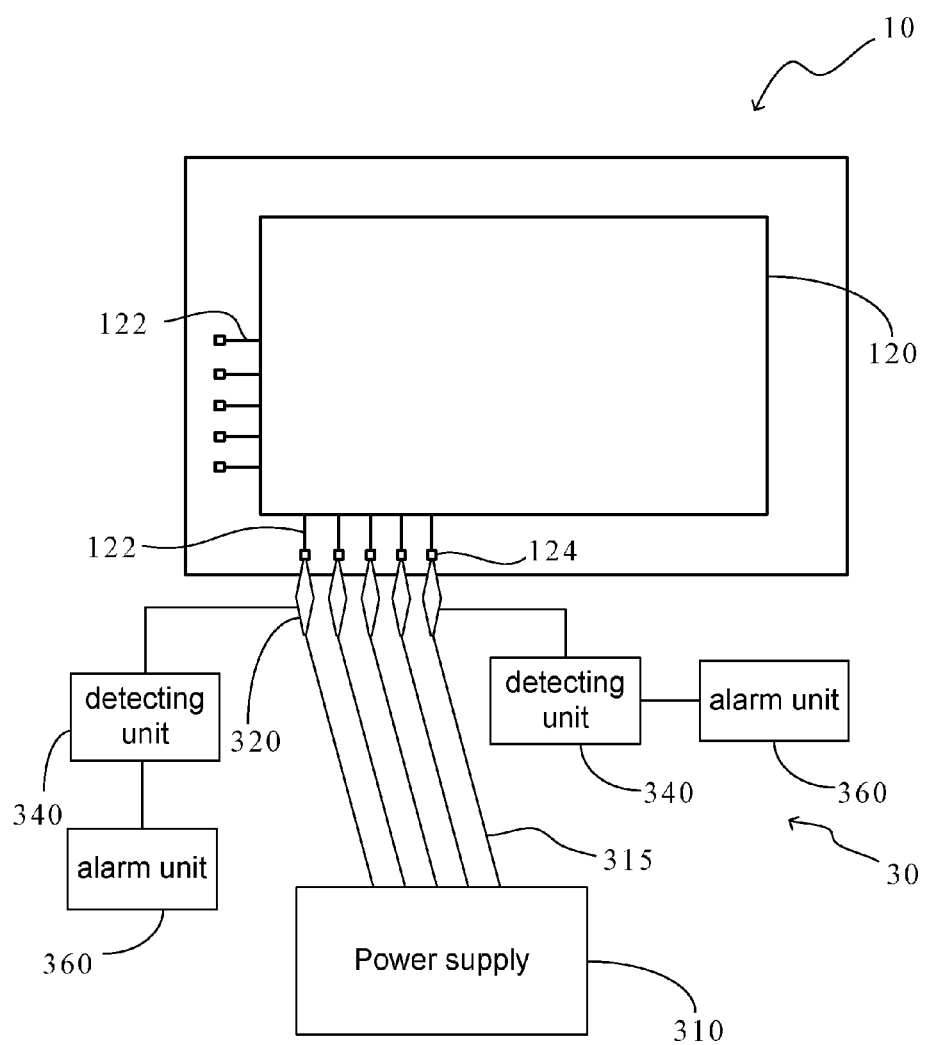
FIG. 2 is a schematic drawing illustrating an apparatus for applying curing voltages to a liquid crystal substrate according to a first preferred embodiment of the present invention.
Figure 3:
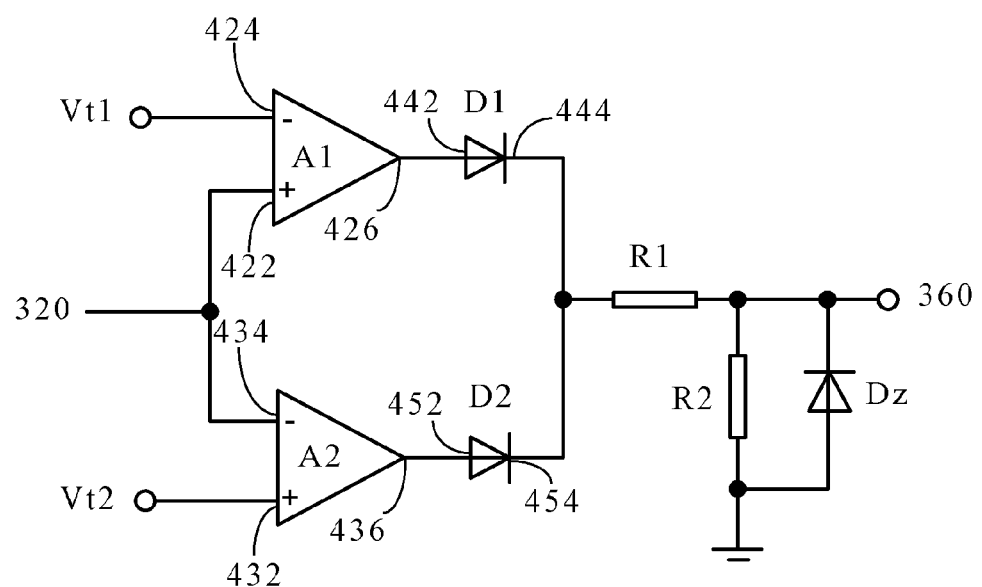
FIG. 3 is a schematic drawing illustrating a circuit of a detecting unit of the embodiment.

Referring to FIG. 2, FIG. 2 is a schematic drawing illustrating an apparatus for applying curing voltages to a liquid crystal substrate according to a first preferred embodiment of the present invention. The voltage applying apparatus 30 of the embodiment is an apparatus that is utilized to apply a voltage on a liquid crystal substrate during a photo-alignment process. However, the voltage applying apparatus of the present invention also can be used for an LC inspection machine, which is used after the alignment process, and for an optical inspection machine, which is used at an alignment terminal. As shown in FIG. 3, the voltage applying apparatus 30 of the embodiment includes a power supply 310, probes 320, detecting units 340, and alarm units 360.

The liquid crystal substrate 10, which has a need for the photo-alignment process, is coupled to the curing voltage applying apparatus 30 of the embodiment via curing lines 122 and corresponding curing pads 124 outside a pixel region 120. The applied predetermined voltage is transmitted to the pixel region 120 via the curing lines 122 by the probe pins 320 of the power supply 310 of the voltage applying apparatus 30 electrically contacting the curing pads 124.

In performing the cure processes, the power supply 310 provides red, green, and blue (RGB) signals for the liquid crystal substrate 10, and the liquid crystal substrate 10 is irradiated by an UV light device (not shown). The voltages of the RGB signals herein are called "curing voltages." Ends of the probes 320 are coupled to a plurality of wires 315 for transmitting the curing voltages outputted from the power supply 310; opposite ends of the probes 320 contact the curing pads 124, so as to apply the curing voltages on the pixel region 120.

The detecting unit 340 is electrically coupled to the probes 320 for determining whether the curing voltages are within a threshold range. The alarm unit 360 is electrically coupled to the detecting unit 340 for giving an alarm prompt when the voltage is not within the threshold range. As shown in FIG. 2, it is worth mentioning that the detecting units 340 of the embodiment are implemented by one being coupled to the first probe 320 and the other one being coupled to the last probe 320. Therefore, it is understandable that all the curing voltages provided for the curing pads 124 are substantially within the threshold range if the two voltages of the first probe 320 and the last probe 320 are within the threshold range. Thus, the alarm unit 360 does not give an alarm prompt. However, when the voltages are not within the threshold range, the alarm prompt is given in order to remind the person without delay.

The detecting unit 340 of the embodiment will be explained in the following. Referring to FIG. 3, FIG. 3 is a schematic drawing illustrating a circuit of the detecting unit 340 of the embodiment. In the embodiment, the detecting unit 340 is a window comparator circuit 400. As shown in FIG. 3, the window comparator circuit 400 includes a first amplifier A1, a first diode D1, a second amplifier A2, a second diode A2, a first resistor R1, a second resistor R2, and a Zener diode Dz.

The first amplifier A1 has a first noninverting input 422, a first inverting input 424, and a first output 426. A first threshold voltage Vt1 is provided for the first inverting input 424. The first diode D1 has a first anode 442 and a first cathode 444; the first anode 442 is coupled to the first output 426 of the first amplifier A1. The second amplifier A2 has a second noninverting input 432, a second inverting input 434, and a second output 436. A second threshold voltage Vt2 is provided for the second noninverting input 432. The voltage (i.e. the curing voltage) is provided for the first noninverting input 422 and the second inverting input 434. The second diode D2 has a second anode 452 and a second cathode 454. The second anode 452 is coupled to the second output 436 of the second amplifier A2. The second cathode 454 and the first cathode 444 of the first diode D1 are coupled to each other and both coupled to the alarm unit 360. It is worth mentioning that there are the first resistor R1 in series connection and the second resistor R2 in parallel connection existing in the connection of the second cathode 454 and first cathode 444 coupled to the alarm unit 360. In addition, the window comparator circuit 400 further includes a Zener diode Dz, whose anode is grounded; whose cathode is coupled to the first cathode 444 of the first diode D1 and the second cathode 454 of the second diode D2, and coupled to the alarm unit 360.

What follows is a detail of the working principle with respect to the window comparator circuit 400. The threshold range is interposed between the first threshold voltage Vt1 and the second threshold voltage Vt2; the difference between the both voltages is a window width. In addition, the first threshold voltage Vt1 is larger than the second threshold voltage Vt2. Specifically, when the voltage is larger than the first threshold voltage Vt1, i.e. V>Vt1>Vt2, the first diode D1 is in a conducting state, the second diode D2 is in a cutoff state, and the window comparator circuit 400 outputs an alarm signal to the alarm unit 360. In the embodiment, based on the function of the Zener diode Dz, the alarm signal which is outputted to the alarm unit 360 is a Zener voltage. Subsequently, the alarm unit 360 gives the alarm prompt according to the alarm signal. The alarm prompt herein includes a prompt of sound, light, or electricity.

When the voltage is less than the second threshold voltage Vt2, i.e. V<Vt2<Vt1, the first diode is in the cutoff state, the second diode is in the conducting state, and the window comparator circuit 400 outputs an alarm signal to the alarm unit 360. Similarly, based on the function of the Zener diode Dz, the alarm signal outputted to the alarm unit 360 is the Zener voltage. Subsequently, the alarm unit 360 gives the alarm prompt according to the alarm signal. The alarm prompt herein includes a prompt of sound, light, or electricity.

When the voltage is within the threshold range, i.e. Vt2<V<Vt1, both the first diode D1 and the second diode D2 are in the cutoff state, and the window comparator circuit 400 outputs 0. That is to say, the window comparator circuit 400 does not output the alarm signal to the alarm unit 360; thus, there is no the alarm prompt being generated.

It should be noted that the detecting units 340 of the present invention are not limited to be implemented by the above-mentioned circuit. Other circuits or chips which are capable of achieving the function of the window comparator are within the scope of the present invention.

Figure 4:
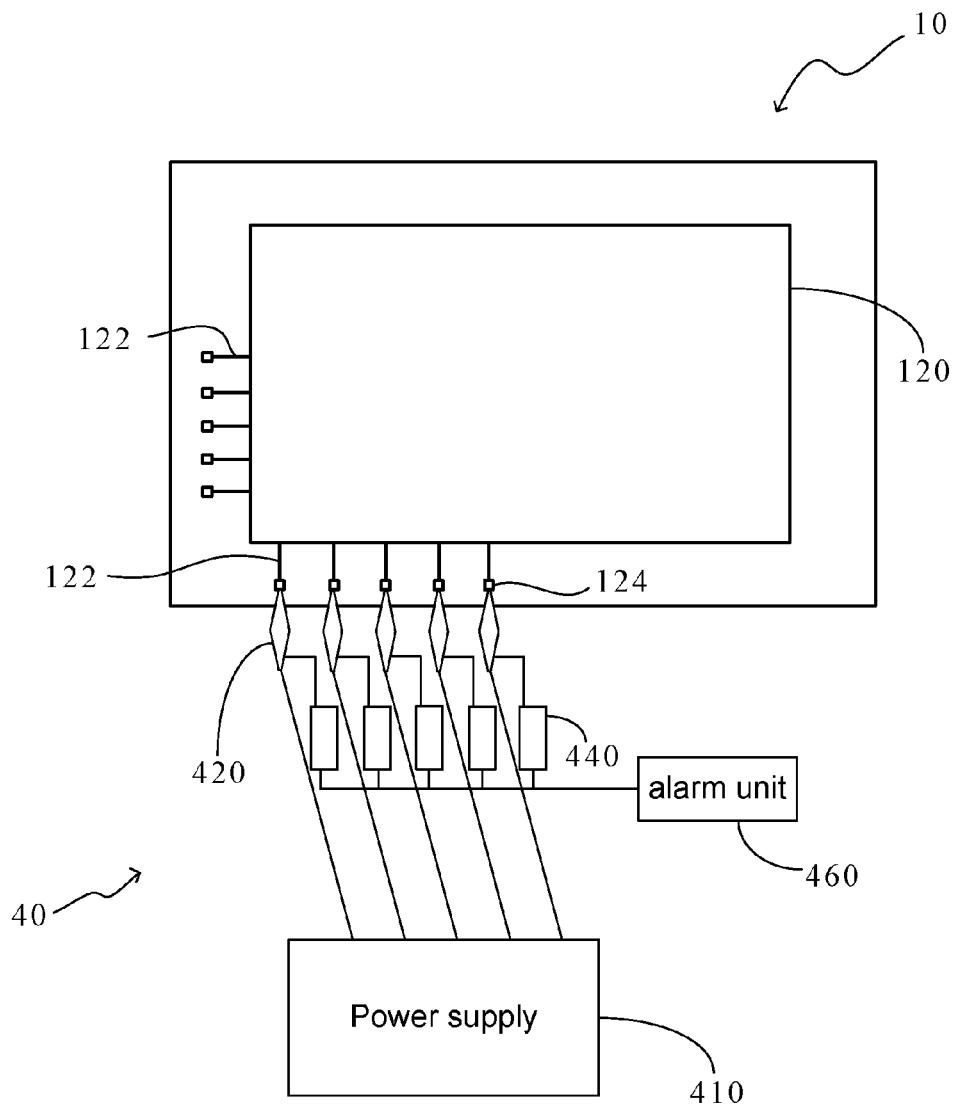
FIG. 4 is a schematic drawing illustrating an apparatus for applying curing voltages to a liquid crystal substrate according to a second preferred embodiment of the present invention.

Referring to FIG. 4, FIG. 4 is a schematic drawing illustrating an apparatus for applying curing voltages to a liquid crystal substrate according to a second preferred embodiment of the present invention. The voltage applying apparatus 40 of the embodiment includes a power supply 410, probes 420, detecting units 440, and alarm units 460.

Similarly, the probes 420 are utilized to apply a plurality of curing voltages to the liquid crystal substrate 10. One difference from the above-mentioned embodiment is that the detecting units 440 are electrically coupled to the probes 420 for determining whether the curing voltages are within a threshold range. Furthermore, as shown in FIG. 4, the detecting units 440 are window comparator circuits which have an equal number of the probes 420, and the detecting units 440 are utilized to determine the curing voltage of every single probe 420, respectively.

The alarm unit 460 are electrically coupled to the detecting units and utilized to give an alarm prompt when any of the curing voltages of the probes 420 is not within the threshold range.

Figure 5:
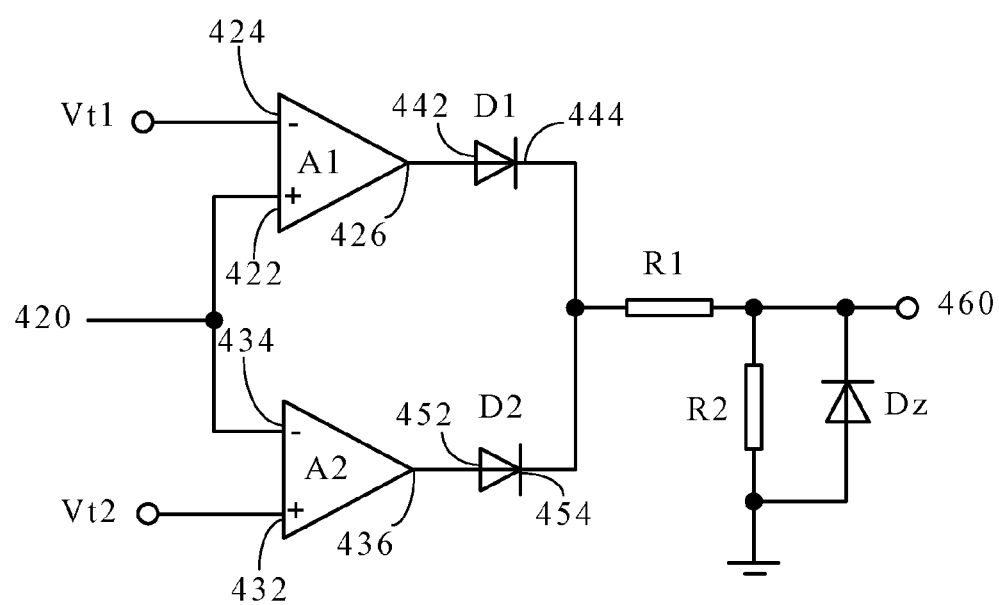
FIG. 5 is a schematic drawing illustrating a circuit of a detecting unit of the embodiment.

The detecting unit 440 of the embodiment will be explained in the following. Referring to FIG. 5, FIG. 5 is a schematic drawing illustrating a circuit of the detecting unit 440 of the embodiment. Similarly, the detecting unit 440 is a window comparator circuit 500. As shown in FIG. 5, the window comparator circuit 500 includes a first amplifier A1, a first diode D1, a second amplifier A2, a second diode A2, a first resistor R1, a second resistor R2, and a Zener diode Dz.

The first amplifier A1 has a first noninverting input 422, a first inverting input 424, and a first output 426. A first threshold voltage Vt1 is provided for the first inverting input 424. The first diode D1 has a first anode 442 and a first cathode 444; the first anode 442 is coupled to the first output 426 of the first amplifier A1. The second amplifier A2 has a second noninverting input 432, a second inverting input 434, and a second output 436. A second threshold voltage Vt2 is provided for the second noninverting input 432. The corresponding probe 420 is electrically coupled to the first noninverting input 422 and the second inverting input 434. The second diode D2 has a second anode 452 and a second cathode 454. The second anode 452 is coupled to the second output 436 of the second amplifier A2. The second cathode 454 and the first cathode 444 of the first diode D1 are coupled to each other and both coupled to the alarm unit 460. It is worth mentioning that there are the first resistor R1 in series connection and the second resistor R2 in parallel connection existing in the connection of the second cathode 454 and first cathode 444 coupled to the alarm unit 460. In addition, the window comparator circuit 500 further includes a Zener diode Dz, whose anode is grounded; whose cathode is coupled to the first cathode 444 of the first diode D1 and the second cathode 454 of the second diode D2, and is coupled to the alarm unit 460.

What follows is a detail of the working principle with respect to the window comparator circuit 500. The threshold range is interposed between the first threshold voltage Vt1 and the second threshold voltage Vt2, and the first threshold voltage Vt1 is larger than the second threshold voltage Vt2. Specifically, when the voltage is larger than the first threshold voltage Vt1, i.e. V>Vt1>Vt2, the first diode D1 is in the conducting state, the second diode D2 is in the cutoff state, and the window comparator circuit 500 outputs an alarm signal to the alarm unit 460. Subsequently, the alarm unit 460 gives the alarm prompt according to the alarm signal. The alarm prompt herein includes the prompt of sound, light, or electricity.

When the voltage is less than the second threshold voltage Vt2, i.e. V<Vt2<Vt1, the first diode is in the cutoff state, the second diode is in the conducting state, and the window comparator circuit 500 outputs an alarm signal to the alarm unit 460. Subsequently, the alarm unit 460 gives the alarm prompt according to the alarm signal. The alarm prompt herein includes the prompt of sound, light, or electricity. One difference from the above-mentioned embodiment is that the outputs of all the window comparator circuits 500 are coupled to the single alarm unit 460; thus, the single alarm unit 460 gives the alarm prompt of sound, light, or electricity if there is any curing voltage exceeding the threshold range.

When the voltage is within the threshold range, i.e. Vt2<V<Vt1, both the first diode D1 and the second diode D2 are in the cutoff state, and the window comparator circuit 500 outputs 0. That is to say, the window comparator circuit 500 does not output the alarm signal to the alarm unit 460; thus, there is no the alarm prompt being generated.

It should be noted that the detecting unit 340 of the present invention is not limited to be implemented by the above-mentioned circuit. Other circuits or chips which are capable of achieving the function of the window comparator are within the scope of the present invention.

In summary, the detecting unit 340 or 440 implemented by the window comparator circuit 400 or 500 according to the present invention can monitor the curing voltages in constant during the curing process. When the curing voltages are within the threshold range, the alarm unit 360 or 460 does not warn; when the curing voltages are not within the threshold range, the alarm prompt is given in order to remind the person without delay. Therefore, the apparatus for applying the curing voltages to the liquid crystal substrate according to the present invention is capable of increasing product yield, so as to reduce the production costs.

While the preferred embodiments of the present invention have been illustrated and described in detail, various modifications and alterations can be made by persons skilled in this art. The embodiment of the present invention is therefore described in an illustrative but not restrictive sense. It is intended that the present invention should not be limited to the particular forms as illustrated, and that all modifications and alterations which maintain the spirit and realm of the present invention are within the scope as defined in the appended claims.

What is claimed is:

1. An apparatus for applying curing voltages to a liquid crystal substrate, comprising:
   a plurality of probes utilized to apply a plurality of curing voltages to the liquid crystal substrate;
   a plurality of window comparator circuits electrically coupled to the probes respectively for determining whether each of the curing voltages is within a threshold range; and
   an alarm unit electrically coupled to the plurality of window comparator circuits and utilized to give an alarm prompt when any of the curing voltages of the probes is not within the threshold range,
   wherein each window comparator circuit comprises:
      a first amplifier having a first noninverting input, a first inverting input, and a first output, wherein a first threshold voltage is provided for the first inverting input;
      a first diode having a first anode and a first cathode, the first anode coupled to the first output of the first amplifier;
      a second amplifier having a second noninverting input, a second inverting input, and a second output, wherein a second threshold voltage is provided for the second noninverting input, and wherein the curing voltages are provided for the first noninverting input and the second inverting input;
      a second diode having a second anode and a second cathode, the second anode coupled to the second output of the second amplifier, the second cathode and the first cathode of the first diode coupled to each other and both coupled to the alarm unit;
      a Zener diode, whose anode is grounded; whose cathode is coupled to the first cathode of the first diode and the second cathode of the second diode, and coupled to the alarm unit;
      a first resistor, coupled between the cathode of the Zener diode and the first cathode of the first diode; and
      a second resistor, connected to the Zener diode in parallel.

2. The apparatus according to claim 1, wherein the threshold range is interposed between the first threshold voltage and the second threshold voltage, and the first threshold voltage is larger than the second threshold voltage.

3. The apparatus according to claim 2, wherein when the voltage is larger than the first threshold voltage, the first diode is in a conducting state, the second diode is in a cutoff state, and the window comparator circuit outputs an alarm signal to the alarm unit; when the voltage is less than the second threshold voltage, the first diode is in the cutoff state, the second diode is in the conducting state, and the window comparator circuit outputs an alarm signal to the alarm unit; when the voltage is within the threshold range, both the first diode and the second diode are in the cutoff state, and the window comparator circuit outputs 0.

4. The apparatus according to claim 1, wherein the alarm prompt given by the alarm unit comprises a prompt of sound, light, or electricity.

5. An apparatus for applying curing voltages to a liquid crystal substrate, comprising:
   a plurality of probes utilized to apply a plurality of curing voltages to the liquid crystal substrate;
   a detecting unit electrically coupled to a first probe and a last probe for determining whether the curing voltages of the first probe and the last probe are within a threshold range; and
   an alarm unit electrically coupled to the detecting unit for giving an alarm prompt when any one of the curing voltages is not within the threshold range,
   wherein the window comparator circuit comprises:
      a first amplifier having a first noninverting input, a first inverting input, and a first output, wherein a first threshold voltage is provided for the first inverting input;
      a first diode having a first anode and a first cathode, the first anode coupled to the first output of the first amplifier;
      a second amplifier having a second noninverting input, a second inverting input, and a second output, wherein a second threshold voltage is provided for the second noninverting input, and wherein the curing voltages are provided for the first noninverting input and the second inverting input;
      a second diode having a second anode and a second cathode, the second anode coupled to the second output of the second amplifier, the second cathode and the first cathode of the first diode coupled to each other and both coupled to the alarm unit;
      a Zener diode, whose anode is grounded; whose cathode is coupled to the first cathode of the first diode and the second cathode of the second diode, and coupled to the alarm unit;
      a first resistor, coupled between the cathode of the Zener diode and the first cathode of the first diode; and
      a second resistor, connected to the Zener diode in parallel.

6. The apparatus according to claim 5, wherein the detecting unit is a window comparator circuit.

7. The apparatus according to claim 5, wherein the threshold range is interposed between the first threshold voltage and the second threshold voltage, and the first threshold voltage is larger than the second threshold voltage.

8. The apparatus according to claim 7, wherein when any one of the curing voltages is larger than the first threshold voltage, the first diode is in a conducting state, the second diode is in a cutoff state, and the window comparator circuit outputs an alarm signal to the alarm unit; when any one of the curing voltages is less than the second threshold voltage, the first diode is in the cutoff state, the second diode is in the conducting, and the window comparator circuit outputs an alarm signal to the alarm unit; when the curing voltages are within the threshold range, both the first diode and the second diode are in the cutoff state, and the window comparator circuit outputs 0.

9. The apparatus according to claim 5, wherein the alarm prompt given by the alarm unit comprises a prompt of sound, light, or electricity.

10. An apparatus for applying curing voltages to a liquid crystal substrate, comprising:
  a plurality of probes utilized to apply a plurality of curing voltages to the liquid crystal substrate;
  a plurality of detecting units electrically coupled to the probes respectively for determining whether each of the curing voltages is within a threshold range; and
  an alarm unit electrically coupled to the detecting units and utilized to give an alarm prompt when any of the curing voltages of the probes is not within the threshold range,
  wherein the detecting units are window comparator circuits which have an equal number of the probes and are utilized to determine the curing voltage of every single probe, respectively,
  wherein the window comparator circuit comprises:
    a first amplifier having a first noninverting input, a first inverting input, and a first output, wherein a first threshold voltage is provided for the first inverting input;
    a first diode having a first anode and a first cathode, the first anode coupled to the first output of the first amplifier;
    a second amplifier having a second noninverting input, a second inverting input, and a second output, wherein a second threshold voltage is provided for the second noninverting input, and wherein the curing voltages are provided for the first noninverting input and the second inverting input;
    a second diode having a second anode and a second cathode, the second anode coupled to the second output of the second amplifier, the second cathode and the first cathode of the first diode coupled to each other and both coupled to the alarm unit;
    a Zener diode, whose anode is grounded; whose cathode is coupled to the first cathode of the first diode and the second cathode of the second diode, and coupled to the alarm unit;
    a first resistor, coupled between the cathode of the Zener diode and the first cathode of the first diode; and
    a second resistor, connected to the Zener diode in parallel.

* * * * *